US008351485B2

(12) United States Patent
Li

(10) Patent No.: US 8,351,485 B2
(45) Date of Patent: *Jan. 8, 2013

(54) TIME-FREQUENCY CODE SPREADING METHOD AND APPARATUS IN OFDMA SYSTEM

(75) Inventor: Hang Li, Beijing (CN)

(73) Assignee: Beijing Xinwei Telecom Technology Inc., Beijing (CN)

( * ) Notice: Subject to any disclaimer, the term of this patent is extended or adjusted under 35 U.S.C. 154(b) by 350 days.

This patent is subject to a terminal disclaimer.

(21) Appl. No.: 12/680,394

(22) PCT Filed: Sep. 27, 2008

(86) PCT No.: PCT/CN2008/072579
§ 371 (c)(1),
(2), (4) Date: Mar. 26, 2010

(87) PCT Pub. No.: WO2009/043311
PCT Pub. Date: Apr. 9, 2009

(65) Prior Publication Data
US 2010/0246641 A1   Sep. 30, 2010

(30) Foreign Application Priority Data

Sep. 27, 2007 (CN) .......................... 2007 1 0122580

(51) Int. Cl.
*H04B 1/00* (2006.01)
(52) U.S. Cl. ........................................ 375/146; 375/260
(58) Field of Classification Search .................. 375/146, 375/260; 370/329
See application file for complete search history.

(56) References Cited

U.S. PATENT DOCUMENTS

| 2006/0224651 A1 | 10/2006 | Madhavapeddi et al. |
| 2008/0090528 A1* | 4/2008 | Malladi ............................ 455/70 |
| 2010/0208676 A1* | 8/2010 | Li et al. .......................... 370/329 |
| 2011/0216808 A1* | 9/2011 | Tong et al. ..................... 375/135 |

FOREIGN PATENT DOCUMENTS

| CN | 1434588 A | 8/2003 |
| EP | 1 699 196 A1 | 9/2006 |

OTHER PUBLICATIONS

International Search Report: PCT/CN2008/072579.

* cited by examiner

*Primary Examiner* — Emmanuel Bayard
(74) *Attorney, Agent, or Firm* — Ladas & Parry LLP

(57) ABSTRACT

The present invention provides a time-frequency code spreading method in an OFDMA system. The method includes: converting a transmission message into one or more modulating signal vectors, and each bit of the transmission message is spread onto all vector elements of a modulating signal vector; mapping one or more modulating signal vectors to a set of time-frequency grids, wherein in an OFDMA time-frequency plane, two time-frequency grids to which any two vector elements in each modulating signal vector are mapped do not have the same frequency location or time location. In addition, the present invention also provides a time-frequency code spreading apparatus in an OFDMA system.

14 Claims, 5 Drawing Sheets

TIME-FREQUENCY CODE SPREADING METHOD AND APPARATUS IN OFDMA SYSTEM

FIELD OF THE INVENTION

The present invention relates to Orthogonal Frequency Division Multiple Access (OFDMA) systems, more particularly to a time-frequency code spreading method and apparatus in an OFDMA system, to combat time-frequency selectivity of channels.

BACKGROUND OF THE INVENTION

In an Orthogonal Frequency Division Multiple Access-Time Division Multiple Access (OFDMA-TDMA) scheme, radio resources are divided into planar time-frequency grids. Each grid represents a certain sub-carrier in a certain time interval. Each access user transmits and receives signals in an allocated waveband and time slot. Due to dispersion characteristics of radio channels, e.g. fading, multipath and interference, receiving qualities of information bits transmitted on different sub-carriers and in different time intervals may be different. Therefore, a part of the information bits passing through such radio channels may be lost because of the serious decay of channel receiving quantities.

A conventional strong channel coding scheme can be used to recover damaged bits. An improved channel coding scheme, e.g. Turbo code and LDPC code, is a most effective scheme when a code block is long enough, about thousands of bits and a coding rate is between a low rate and a middle rate. However, a simple channel coding scheme has no advantages when the code block is relatively short and the coding rate is relatively high. In addition, the improved coding scheme results in high complexity.

Therefore, embodiments of the present invention provide a time-frequency code spreading method and apparatus to combat time-frequency selectivity of channels in the OFDMA system, in which a code spreading technology based on each sub-channel is applied to the OFDMA system. In the embodiments of the present invention, advantages of the code spreading technology are not limited by bandwidth, so as to combat the time-frequency selectivity of channels and interference.

SUMMARY OF THE INVENTION

Embodiments of the present invention provide a time-frequency code spreading method in an OFDMA system, to combat time-frequency selectivity. In the method, each information bit is spread into a multi-dimensional signal, and the multi-dimensional signal is mapped along with a direction in which a channel spreading degree on a time-frequency planar plane is the largest, so as to avoid serious signal deterioration after a receiver dispreads the multi-dimensional signal.

The embodiments of the present invention also provide a time-frequency code spreading apparatus in the OFDMA system, to combat the time-frequency selectivity. The apparatus includes: a vector converting module and a mapping processing module.

The vector converting module is adapted to convert a transmission message into one or multiple modulating signal vectors, wherein each bit of the transmission message is spread onto all vector elements of one modulating signal vector.

The mapping processing module is adapted to map the one or more modulating signal vectors to a set of time-frequency grids, wherein in an OFDMA time-frequency plane, two time-frequency grids to which any two vector elements in each modulating signal vector are mapped do not have the same frequency location or time location.

DETAILED DESCRIPTION OF THE INVENTION

Embodiments of the present invention are described hereinafter in detail with reference to the accompany drawings.

In an OFDMA system, radio resources are divided into planar time-frequency grids. Each grid represents a sub-carrier in a certain time interval. For given available bandwidth B, there are $N=B/\Delta f$ sub-carriers in each time interval, where $\Delta f$ is a frequency interval between the sub-carriers. N sub-carriers are divided into $N_{scg}$ wavebands, and each waveband contains $K=N/N_{scg}$ continuous sub-carriers. Moreover, every $N_{slot}$ continuous time intervals constitutes a time slot. Each access user transmits and receives signals in an allocated waveband and time slot.

Figure 1:
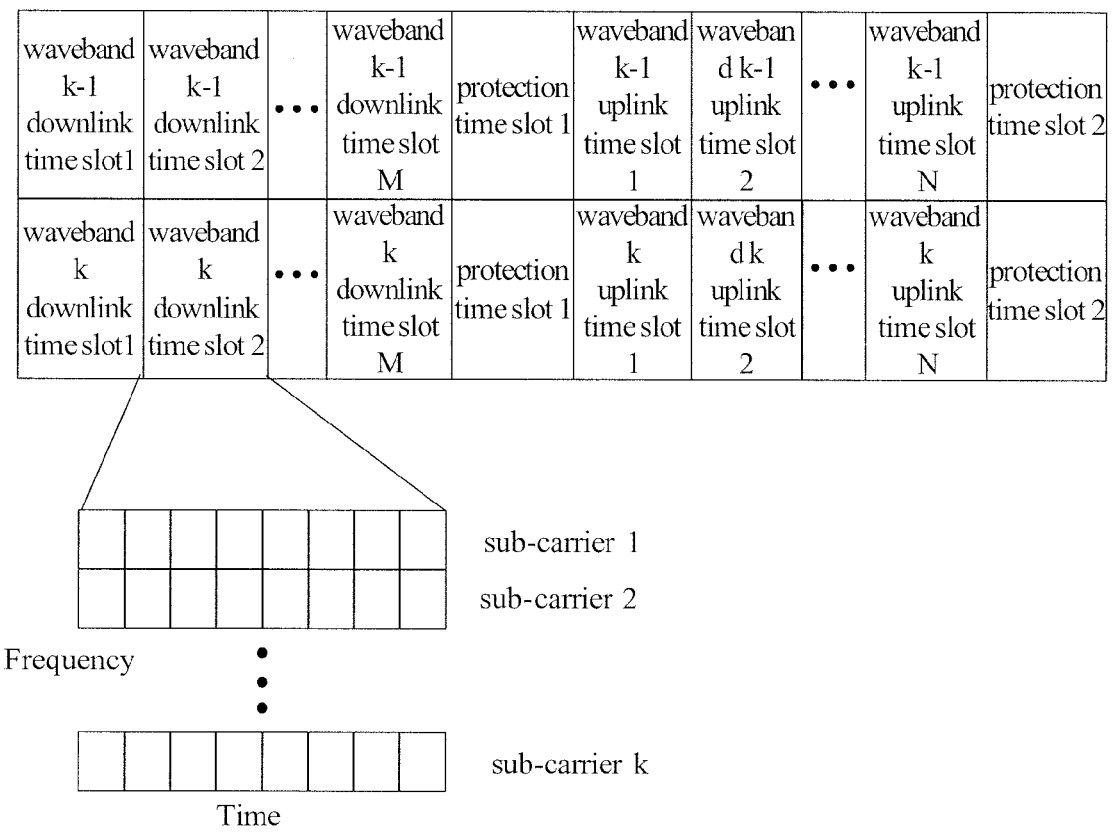
FIG. 1 is a schematic diagram illustrating a typical resource allocating scheme of an OFDMA-TDMA Time Division Duplex (TDD) system.
Figure 2:
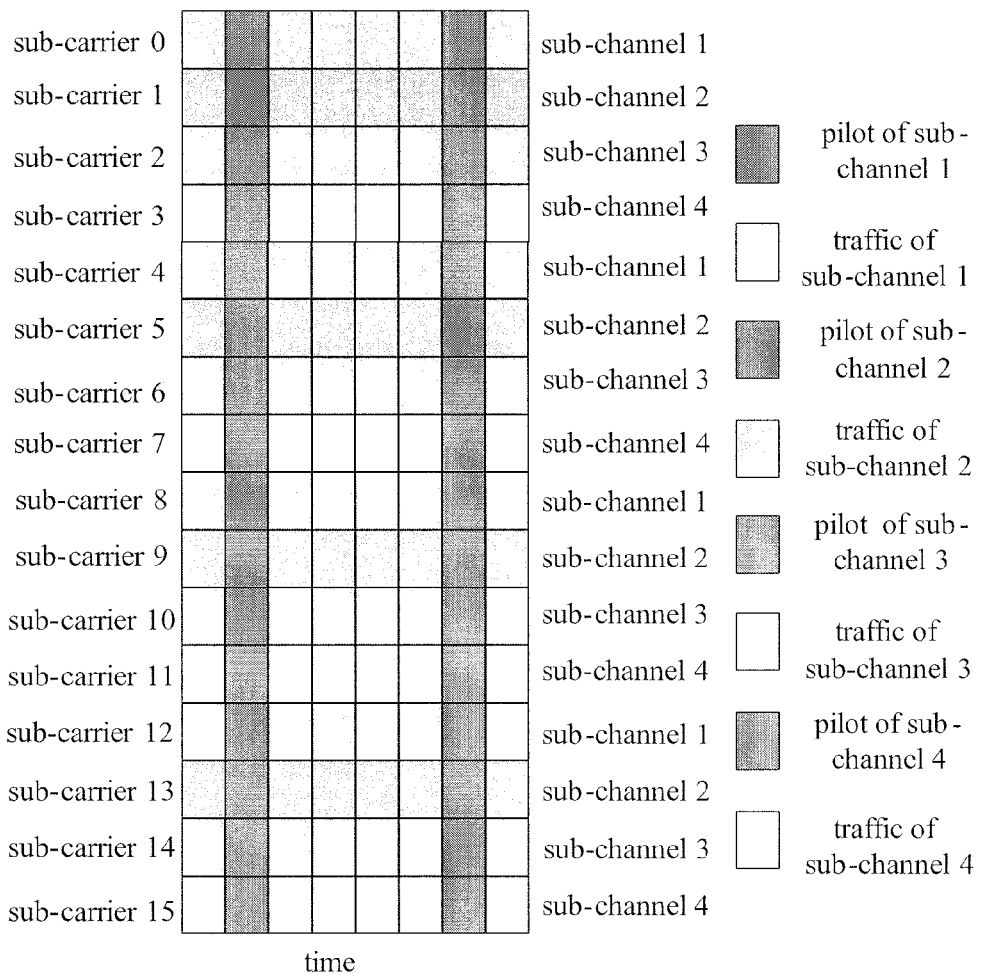
FIG. 2 is a schematic diagram illustrating an ideal distributed division of sub-carriers in a waveband of a certain time slot.

For an access scheme not supporting Space Division Multiple Access (SDMA), subsets of discontinuous sub-carriers should be allocated to different users. A typical resource allocating scheme of an OFDMA-TDMA TDD system is shown in FIG. 1, in which uplink frames and downlink frames are transmitted alternatively. In each frame, a user transmits signals according to allocated sub-carriers, wavebands and time slots. The allocation of the sub-carriers is determined according to the division of the sub-carriers in each waveband of each time slot. The sub-carriers in one waveband may be divided into $N_{sch}$ groups, and each group contains $N_j=K/N_{sch}$ sub-carriers. Time-frequency grids corresponding to each group of sub-carriers in a time slot constitute a sub-channel, and the sub-channel is taken as a basic cell of resource allocation. FIG. 2 is a schematic diagram illustrating an ideal distributed division of sub-carriers in a waveband of a certain time slot. The waveband of a time slot contains 16 sub-carriers of 8 continuous time intervals, i.e. $N_{slot}=8$ and $N=16$. In each time slot, the 16 sub-carriers are divided into 4 sub-channels, each sub-channel is composed of 4 distributed sub-carriers, and the sub-carriers of the 4 sub-channels interleave with each other. The sub-channel is a basic cell of sub-carrier allocation. Different bandwidth requirements need different sub-channel amounts. The above division of the sub-carriers may not be limited by the allocated sub-channel numbers, so that frequency diversities of different sub-channels have the same diversity order.

Figure 3:
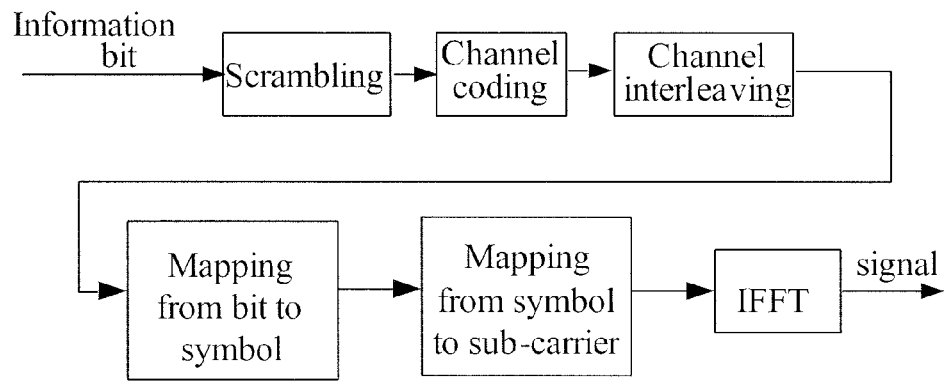
FIG. 3 is a block diagram illustrating a typical transmitting procedure of an OFDMA system.

Due to the spreading characteristics of radio channels, e.g. fading, multipath and interference, receiving qualities of information bits transmitted on different sub-carriers and in different time intervals may be different. Therefore, a part of the information bits passing through such radio channels may be lost because of serious decay of channel receiving qualities. A conventional strong channel coding scheme can be used to recover damaged bits. An improved channel coding scheme, e.g. Turbo code and LDPC code, is a most effective scheme when a code block is long enough, about thousands of bits, and a coding rate is between a low rate and a middle rate. FIG. 3 is a block diagram illustrating a transmitting procedure of an OFDMA system. Coded/interleaved bits are firstly converted to digital symbols, and then mapped onto OFDMA symbols. If partial bits are damaged during transmitting, these damaged bits will be recovered through channel coding. However, a simple channel coding scheme has no advantages when the code block is relatively short and the coding rate is relatively high. In addition, the improved coding scheme results in high complexity, e.g. coding will cause the increase of information bits, which makes the bandwidth occupation larger. Therefore, it is advantageous that a code spreading technology based on each sub-channel is applied to the OFDMA system. Compared with the coding scheme, advantages of code spreading technology are not limited by bandwidth.

In an embodiment of the present invention, a time-frequency code spreading method includes the following steps.

Firstly, a transmission message is converted into one or more modulating signal vectors, and each bit of the transmission message is spread onto all vector elements of one modulating signal vector.

Afterwards, the one or more modulating signal vectors are mapped to a set of time-frequency grids, in an OFDMA time-frequency plane, two grids to which any two vector elements in each modulating signal vector are mapped do not have the same frequency location or time location.

Specifically, time-frequency grids in the OFDMA time-frequency plane are divided into multiple basic subsets, and each basic subset is one sub-channel. When the time-frequency grids are divided into multiple basic subsets, sub-carriers are divided in a distributed manner. As shown in FIG. 2, continuous sub-carriers are evenly distributed into different sub-channels. For example, a sub-carrier 0 is distributed into a sub-channel 1, and a sub-carrier 1 is distributed into a sub-channel 2.

According to the dividing of the basic subsets, the modulating signal vectors are mapped to the OFDMA time-frequency plane. For example, a modulating signal vector is firstly mapped to time-frequency grids in the sub-channel 1. If the bit number of the modulating signal vector exceeds the number of the time-frequency grids in the sub-channel 1, the exceeding part is mapped to time-frequency grids of the sub-channel 2.

Further, when the modulating signal vector is mapped to the time-frequency grids of the sub-channel 1, it should be guaranteed that two grids to which any two vector elements in the modulating signal vector are mapped do not have the same frequency location or time location.

Figure 4:
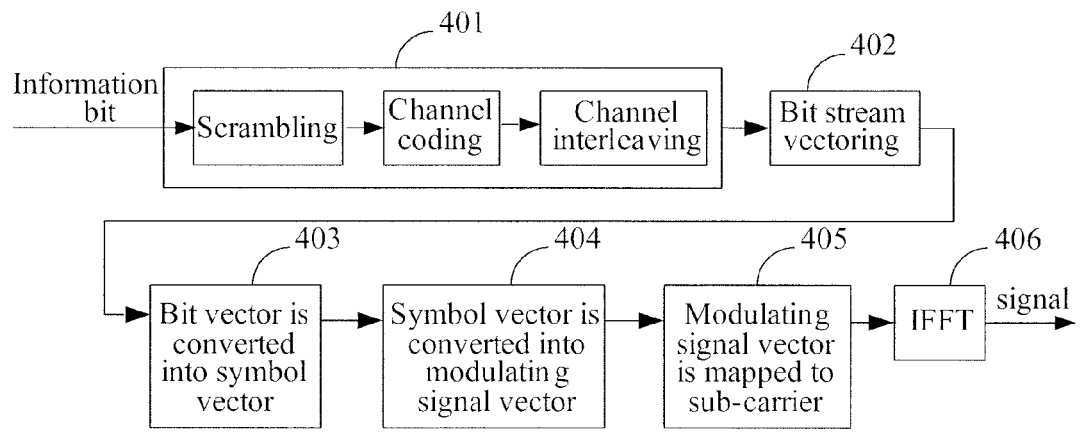
FIG. 4 is a block diagram illustrating a transmitting procedure of an OFDMA system adopting a code spreading technology in accordance with an embodiment of the present invention.

FIG. 4 is a block diagram illustrating a transmitting procedure of an OFDMA system adopting a code spreading technology. It should be noted that in a radio communication system adopting the OFDMA scheme, signals are transmitted in a time slot manner, and in each time slot, radio resources are divided into time-frequency grids.

Step 401: After an information bit stream of a transmission message is scrambled, a coded bit stream is generated through channel coding and is output after channel interleaving.

Step 402: The output bit stream is divided into Q groups, and each group contains a bit vector of L×M bits. Where, M is the number of bits carried by each symbol, and L is the number of symbols which will be spread onto $N_f$ sub-carriers.

Step 403: According to a given modulation scheme, each group of the bit vectors are converted into a symbol vector with a size of L×1.

Step 404: The symbol vector is converted into a modulating signal vector through a code spreading matrix. Specifically, each symbol vector with a size of L×1 is multiplied by a code spreading matrix with a size of N×L, and a modulating signal vector with a size of N×1 is obtained.

The code spreading matrix may be a complex matrix or a real matrix. N should be larger than or equal to L, so that a receiver can receive the symbol vector correctly and reliably. After the above converting, each bit of the transmission message is spread onto all vector elements of one modulating signal vector.

In a specific example, it is supposed that the code spreading matrix is W and the symbol vector is s(k), the modulating signal vector x(k) can be obtained according to formula (1):

$$x(k)=Ws(k) \quad (1)$$

Where, k=1, ..., K, K is the number of sub-carriers in each waveband.

Step 405: According to a configured rule, the modulating signal vector is mapped to OFDMA grids allocated to a user. The mapping should be based on each sub-channel, and two grids to which any two vector elements in each modulating signal vector are mapped do not have the same frequency location or time location.

In specific implementations, sub-carriers of the first allocated sub-channel are firstly mapped, then sub-carriers of the second allocated sub-channel are mapped, and the rest may be deduced by analogy. Because there are $N_{slot}$ time intervals in each sub-channel, $N_s=L\times(N_{slot}-N_p-N_e)$ signals may be mapped. Where, $N_p$ is the number of pilot symbols inserted in each sub-carrier in each sub-channel, $N_e$ is the number of null symbols inserted in each sub-carrier in each sub-channel, and there is no energy transmission on the null symbols. According to a configured rule, all bits in Q groups of bit vectors may be mapped through $\lceil Q/(N_{slot}-N_p-N_e)\rceil$ sub-channels.

Generally, it is supposed that there are $N_{sch}$ sub-channels in each waveband, and each sub-channel is composed of $N_f$ sub-carriers and $N_{slot}$ time intervals. At this time, $N_{slot}\times N_f$ time-frequency grids are allocated to each sub-channel. If null symbols are not inserted, for the $k_{th}$ sub-channel, $N_{slot}-N_p$ modulating signal vectors with a size of $N_f\times 1$ can be mapped to time-frequency grids of the $k_{th}$ sub-channel. Specifically, the mapping is performed according to formula (2):

$$i=m\cdot N_{sch}+k$$

$$j=\mathrm{mod}(m+n, N_{slot}-N_p)$$

$$m=1,\ldots,N_f \quad (2)$$

$$n=1,\ldots,N_{slot}-N_p$$

The $m_{th}$ vector element of the $n_{th}$ modulating signal vector will be mapped to the time-frequency grid (j, i) of the $k_{th}$ sub-channel, where j is a relative time location in the same sub-channel from which a pilot location is removed, and i is a relative frequency location of all the sub-carriers in the waveband. If a null symbol needs to be inserted, a certain vector element of one or more modulating signal vectors may be replaced with the null symbol.

Of cause, in a certain sub-channel, the manner of mapping the modulating signal vector to the time-frequency grids is not limited to formula (2), and another mapping rule may be configured according to one or more of n, m, k, $N_{sch}$, $N_{slot}$ and $N_p$.

Step 406: After all the allocated sub-carriers are mapped, an Inverse Fast Fourier Transform (IFFT) is performed by using the modulated time-frequency grids to generate a transmission signal.

As can be seen, by generating the modulating signal vector and mapping the modulating signal vector to the time-frequency grids of the OFDMA system, the diversity degree of each transmitted bit can be increased effectively. In practical cases, diversity gains rely on the manner of that mapping the modulating signal vector to the time-frequency grids of sub-channel allocated by the OFDMA system.

Figure 5:
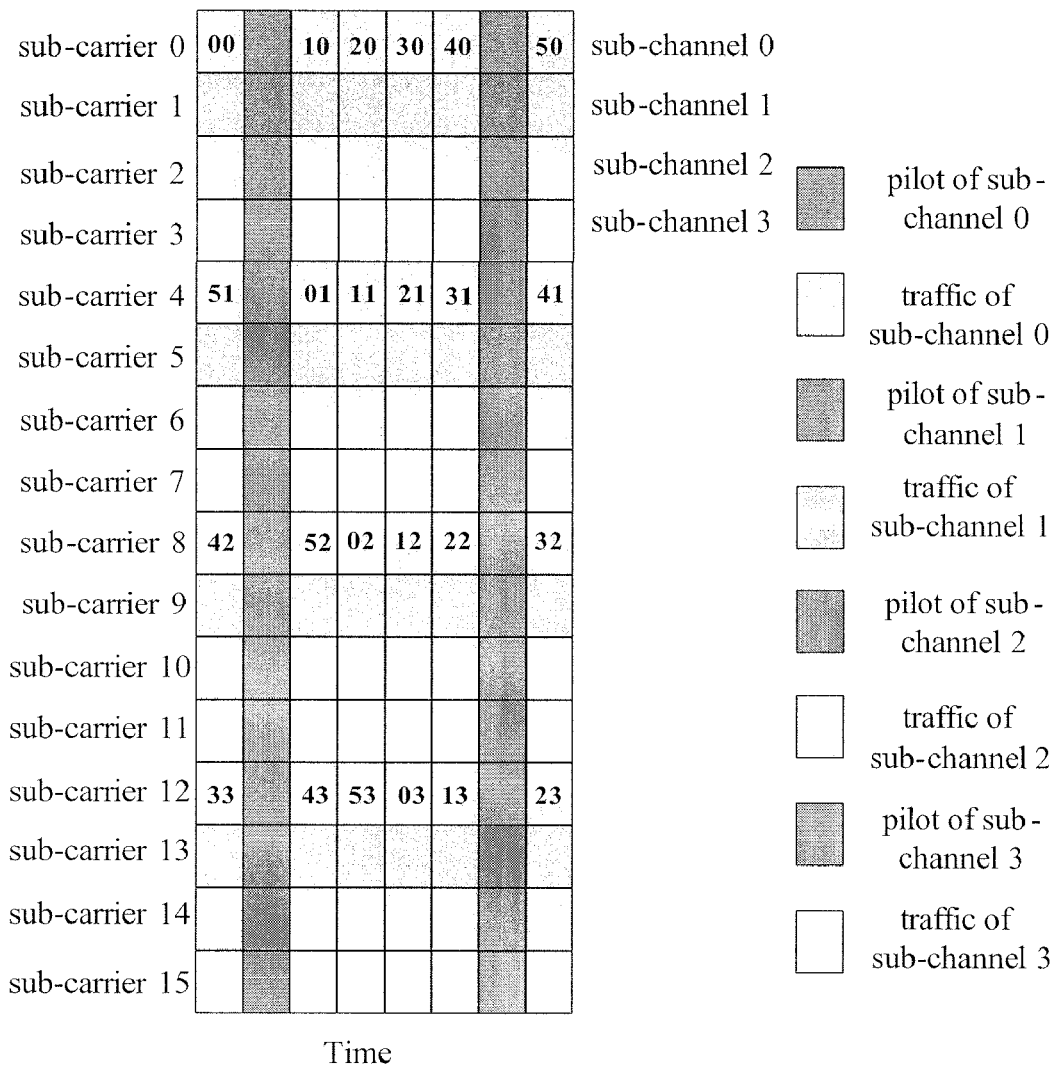
FIG. 5 is a schematic diagram illustrating a code spreading method when sub-carriers are distributed evenly.

By taking FIG. 5 as an example, the mapping of the modulating signal vector to the time-frequency grids of sub-channel is described hereinafter in detail. FIG. 5 is a schematic diagram illustrating a code spreading method of the first sub-channel, i.e. the sub-channel 0. In this embodiment, the number of pilot symbols is $N_p$=2, the number of time intervals is $N_{slot}$=8, the number of sub-carriers of the sub-channel 0 is $N_f$=4, and 24 modulating signals need to be mapped to sub-carriers of the sub-channel 0.

The 24 modulating signals are divided into 6 groups, and each group is represented with a modulating signal vector x(t) with a size of $N_f \times 1$. The first modulating signal vector x(1) has 4 vector elements, and element indexes of the 4 vector elements are 00, 01, 02 and 03. Similarly, element indexes of the second modulating signal vector x(2) are 10, 11, 12 and 13, and the rest may be deduced by analogy.

As can be seen from FIG. 5, time-frequency grid areas allocated to the sub-channel 0 constitutes a grid array, and each grid element in the grid array has both a time index and a frequency index. When a vector element is mapped to the grid array, the values of the time index and frequency index of the vector element are respectively increased one by one or two by two according to the values of the time index and frequency index of the former grid in the grid array. For example, after a vector element with an element index of 12 is mapped to a time-frequency grid, the time index and the frequency index of the vector element are the time index and the frequency index of the vector element with an element index of 11 plus 1. The grid array of the sub-channel 0 includes a sub-carrier 0, a sub-carrier 4, a sub-carrier 8, a sub-carrier 12 and corresponding time intervals. Therefore, the vector element with the element index of 11 is on the sub-carrier 4, and the vector element with the element index of 12 is on the sub-carrier 8, i.e. time index value plus 1. As can be seen, the vector element with the element index of 11 and the vector element with the element index of 12 are different in both the frequency location and time location.

It can be calculated according to the formula (2) how a certain vector element is mapped to the time-frequency grids in the whole waveband, and the value of m is modified into m=0, . . . , $N_f$−1. The vector element with the element index of 12 is also taken as an example, and the vector element is the second vector element of the second modulating signal vector of the sub-channel 0. Several parameters corresponding to the vector element includes: n=2, m=2, k=1, $N_{sch}$=4, $N_{slot}$=8, $N_p$=2, and thus, i=m·$N_{sch}$+k=9, j=mod(m+n, $N_{slot}$−$N_p$)=4 can be obtained.

In the current communication environment, there are various kinds of interference in the procedure of transmitting signals, e.g. multi-cell interference which is caused by communication links of other cells adopting the same code spreading technology and presents similar time and frequency spreading, narrowband interference which will generate large noises in a few sub-carriers; pulse interference which is a pulse noise interfering with receiving signals in a short time. After modulating signals are processed by using the code spreading technology, these kinds of channel interference will only affect a part of each modulating signal vector. In this way, when the signal is received, a proper signal checking method, e.g. a method based on minimum mean-square error, can recover the s(k), and can effectively obtain a diversity. Based on characteristics of radio channels, different mapping methods may achieve different diversity gains.

If a radio channel only has time selectivity, the radio channel may be represented by formula (3):

$$h(t) = \sum_{l=0}^{P} \gamma_l e^{j\pi\omega_l t}\delta(t) \quad (3)$$

Where, $\omega_1$ is a Doppler frequency of the lth path, and $\gamma_1$ is a complex amplitude corresponding to the lth path. In this case, a maximum diversity order number may be obtained once the modulating signal vector is mapped in a time domain.

If a radio channel is time invariant, but has multipaths with significantly different time delays, as shown in the following formula:

$$h(t, \tau) = \sum_{l=0}^{P} \gamma_l \delta(t - \tau_l),$$

and the frequency response is presented by $$H(\omega) = \sum_{l=0}^{P} \gamma_l e^{j\pi\omega\tau_l}.$$

For the above channel, the modulating signal vectors mapped to the OFDMA signals only on a frequency domain are obtained. In addition, in order to adequately utilize frequency diversity resources, adjacent sub-carriers will not be allocated to the same sub-channel, as shown in FIG. 2.

Actually, the time domain and frequency domain of the radio channel both have fluctuation, a mathematics model is shown as follows:

$$h(t, \tau) = \sum_{l=0}^{P} \gamma_l(t)\delta(t - \tau_l),$$

and the frequency and time response is shown as follows:

$$H(\omega, t) = \sum_{l=0}^{P} \gamma_l e^{j2\pi(\omega\tau_l + \omega_l t)}.$$

Obviously, H(ω,t) changes with ω and t, and has frequency selectivity and time selectivity. Therefore, the preferable mapping from the modulating signal vector to the sub-carriers should change with the time domain and the frequency domain.

Specifically, a receiving signal model may be shown as y(k)=Φ(k)Ws(k)+v(k). Where, v(k) is a Gauss white noise, Φ(k) is a diagonal matrix, and diagonal elements in Φ(k) represents channel response coefficients corresponding to time-frequency grids allocated to the $k_{th}$ symbol vector.

In an embodiment of the present invention, the value of Φ(k) is as shown as formula (4):

$$\Phi(k) = \begin{bmatrix} H(\omega_1, t_1) & 0 & 0 & 0 \\ 0 & H(\omega_2, t_2) & 0 & 0 \\ 0 & 0 & \ddots & 0 \\ 0 & 0 & 0 & H(\omega_{N_f}, t_{N_f}) \end{bmatrix} \quad (4)$$

The above mapping from the sub-channels to the sub-carriers and the code spreading method require $\omega_i \neq \omega_j$ and $t_i \neq t_k$ (i≠j). The channel response of each symbol may be represented by $H(\omega_i, t_i)$ (i=1, ..., $N_f$).

Since a mobile channel is two-dimensional dispersive, the possibility of all $H(\omega_i, t_i)$ values becoming bad is low, and the possibility of symbols being recovered is high after proper checking operations.

In addition, v(k)=[v(ω_1, $t_{N_f}$), ..., v($\omega_{N_f}$, $t_{N_f}$)] may also present time-frequency selectivity. This case will occur when some time-frequency grids are interfered with.

For the above receiving signal model, Minimum Mean-Square Error (MMSE) checking or ZF checking may be used, which all utilize a fixed channel diversity in channels. The algorithm of the MMSE checking is shown by the following formula:

$$\hat{s}(k) = (W^*|\Phi(k)|^2 W + I)^{-1} W^* \Phi^*(k) y(k).$$

The algorithm of the ZF checking is shown by the following formula:

$$\hat{s}(k) = (W^*|\Phi(k)|^2 W)^{-1} W^* \Phi^*(k) y(k).$$

Figure 6:
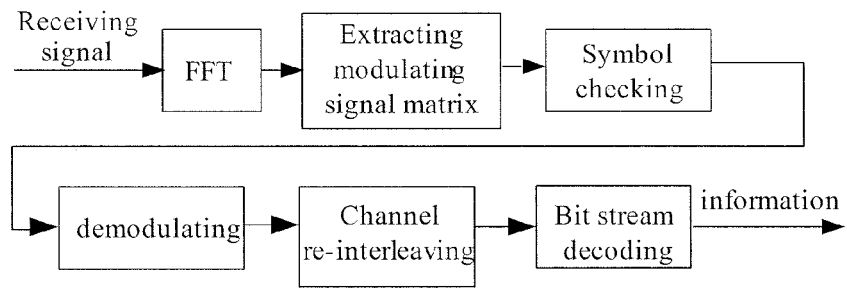
FIG. 6 is a block diagram illustrating a receiving procedure of an OFDMA system adopting a code spreading technology in accordance with an embodiment of the present invention.

The above receiving procedure is shown in FIG. 6. Specifically, FFT is performed for received signals, and then a modulating signal matrix is extracted and symbol checking is performed. Signals obtained through the symbol checking are demodulated, re-interleaved and decoded to obtain a bit stream. Where, the modulating signal matrix is extracted from the time-frequency grids according to a mapping relation between the modulating signal vector used by the transmitter and the time-frequency grids.

Figure 7:
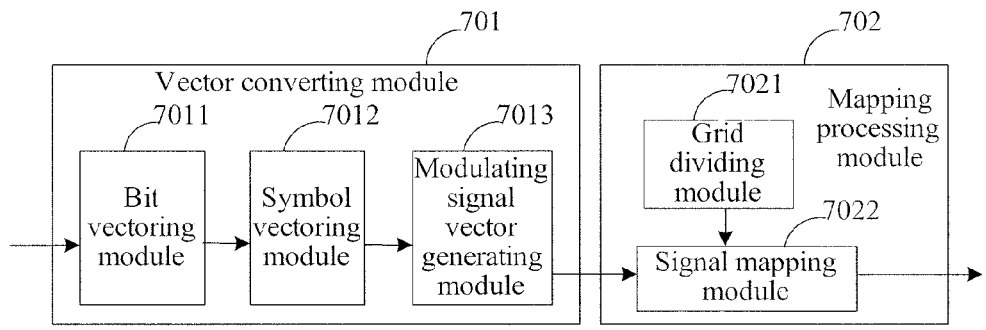
FIG. 7 is a structure diagram illustrating a time-frequency code spreading apparatus configured in a transmitter in accordance with an embodiment of the present invention.
Figure 8:
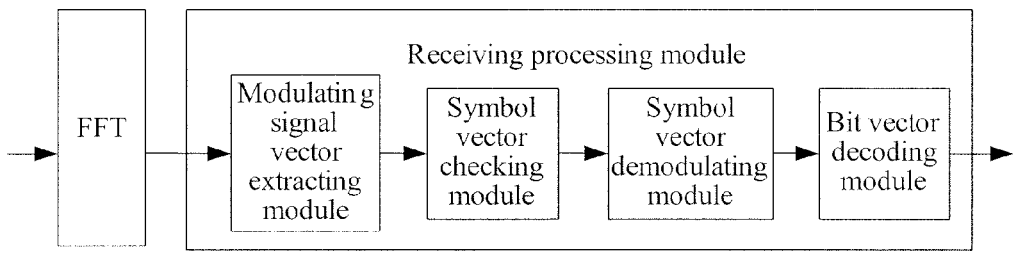
FIG. 8 is a structure diagram illustrating a receiver corresponding to the transmitter shown in FIG. 7.

FIG. 7 is a structure diagram illustrating a time-frequency code spreading apparatus configured in a transmitter of an OFDMA system, and the apparatus includes a vector converting module 701 and a mapping processing module 702.

The vector converting module 701 is adapted to convert a transmission message into one or more modulating signal vectors, so that each bit of the transmission message can be spread onto all vector elements of one modulating signal vector. Specifically, the vector converting module 701 includes: a bit vectoring module 7011, adapted to divide the transmission message into a group of bit vectors, a symbol vectoring module 7012, adapted to map the bit vectors to symbol vectors, a modulating signal vector generating module 7013, adapted to convert each symbol vector into a modulating signal vector with a dimension number being larger than or equal to the dimension number of the symbol vector. Specifically, the modulating signal vector generating module 7013 may obtain the modulating signal vector by multiplying each symbol vector by a real or complex code spreading matrix whose dimension number matches with the dimension numbers of the symbol vector and the modulating signal vector.

The mapping processing module 702 is adapted to map one or more modulating signal vectors to a set of time-frequency grids, so that in a time-frequency plane of an OFDMA system, two grids to which any two vector elements in each modulating signal vector are mapped do not have the same frequency location or time location. Specifically, the mapping processing module 702 includes a grid dividing module 7021, adapted to divide all time-frequency grids in each time slot into multiple basic subsets which are not intersected with each other, the number of sub-carriers contained in the basic subsets are the same, and the number of time-frequency grids contained in each sub-carrier is the same, and the time-frequency grids contained in each sub-carrier are time-continuous in the time slot; a signal mapping module 7022, adapted to map one or more modulating signal vectors to time-frequency grids of an allocated basic subset according to the dividing of the basic subsets performed by the grid dividing module 7021. In practical applications, each basic subset is a sub-channel, and these sub-channels are mapped orderly. Referring to FIG. 5, a sub-channel 0 is mapped firstly; when time-frequency grids of the sub-channel 0 are used up, i.e. the time-frequency grids of the sub-channel 0 are not enough to carry all the modulating signal vectors, the rest modulating signal vectors are mapped to the next allocated sub-channel, i.e. the sub-channel 1, and the rest may be deduced by analogy. In addition, the signal mapping module 7022 may insert one or more null symbols in the modulating signal vector, so that no energy is transmitted on one or more time-frequency grids of the basic subset.

Further, a receiving processing module may be configured in a receiver, and is adapted to receive one or more modulating signal vectors, and check all contained bits to recover a transmission message. The receiving processing module may extract one or more modulating signal vectors according to the same mapping rule adopted by the mapping processing module 702, check symbol vectors by using the modulating signal vectors, and demodulate and decode one or more symbol vectors to recover the transmission massage.

As can be seen, the code spreading method and apparatus provided by the present invention not only can combat channels with frequency selectivity, channels with time selectivity and channels with both frequency selectivity and the time selectivity, but also can combat the multi-cell interference, the narrow interference, the pulse interference and other channel interference caused by a transient effect at a switch point between time slots. In addition, the code spreading method provided by the present invention can solve a radio stability problem in time slot switches.

The foregoing is merely embodiments of the present invention, and not used to limit the protection scope of the present invention.

What is claimed is:

1. A time-frequency code spreading method in an Orthogonal Frequency Division Multiple Access (OFDMA) system, comprising:
   converting a transmission message into one or more modulating signal vectors by a vector converting module of the OFDMA system, wherein each bit of the transmission message is spread onto all vector elements of one modulating signal vector; and mapping the one or more modulating signal vectors to a set of time-frequency grids by a mapping processing module of the OFDMA system, wherein in an OFDMA time-frequency plane, two time-frequency grids to which any two vector elements in each modulating signal vector are mapped do not have the same frequency location or time location.

2. The method of claim 1, wherein converting a transmission message into one or more modulating signal vectors comprises:
dividing the transmission message into multiple bit vectors;
converting each bit vector into a symbol vector according to a given modulation method; and
mapping each symbol vector to obtain a modulating signal vector, wherein a dimension number of the modulating signal vector is larger than or equal to a dimension number of the symbol vector.

3. The method of claim 2, wherein mapping each symbol vector to obtain a modulating signal vector comprises: multiplying each symbol vector by a code spreading matrix whose dimension number matches with the dimension numbers of the symbol vector and the modulating signal vector to obtain the modulating signal vector; wherein the code spreading matrix is a real matrix or a complex matrix.

4. The method of claim 1, wherein mapping the one or more modulating signal vectors to a set of time-frequency grids comprises:
dividing all the time-frequency grids in each time slot into multiple basic subsets which are not intersected with each other, wherein the number of sub-carriers contained in each basic subset is the same, and the number of time-frequency grids contained in each sub-carrier is the same, and the time-frequency grids contained in each subcarrier are time-continuous in the time slot; and
mapping the one or more modulating signal vectors to the time-frequency grids of an allocated basic subset, if the time-frequency grids of one basic subset are used up, the rest modulating signal vectors are mapped to a next allocated basic subset.

5. The method of claim 4, wherein mapping the one or more modulating signal vectors to the grids comprises: inserting one or more null symbols in the modulating signal vector.

6. The method of claim 1, further comprising:
receiving one or more modulating signal vectors, and checking all bits contained in the one or more modulating signal vectors, to recover the transmission message.

7. The method of claim 6, wherein the receiving comprises:
extracting one or more modulating signal vectors from time-frequency grids according to a mapping rule between the modulating signal vectors and the time-frequency grids, checking the modulating signal vectors to obtain one or more symbol vectors, and demodulating and decoding the one or more symbol vectors to recover the transmission message.

8. A time-frequency code spreading apparatus in an Orthogonal Frequency Division Multiple Access (OFDMA) system, comprising:
a vector converting module, adapted to convert a transmission message into one or multiple modulating signal vectors, wherein each bit of the transmission message is spread onto all vector elements of one modulating signal vector; and
a mapping processing module, adapted to map the one or more modulating signal vectors to a set of time-frequency grids, wherein in an OFDMA time-frequency plane, two time-frequency grids to which any two vector elements in each modulating signal vector are mapped do not have the same frequency location or time location.

9. The apparatus of claim 8, wherein the vector converting module comprises:
a bit vectoring module, adapted to divide the transmission message into multiple bit vectors;
a symbol vectoring module, adapted to map each bit vector to obtain a symbol vector; and
a modulating signal vector generating module, adapted to convert each symbol vector into a modulating signal vector, wherein a dimension number of the modulating signal vector is larger than or equal to a dimension number of the symbol vector.

10. The apparatus of claim 9, wherein the modulating signal vector generating module obtains the modulating signal vector by multiplying each signal vector by a code spreading matrix whose dimension number matches with the dimension numbers of the symbol vector and the modulating signal vector.

11. The apparatus of claim 8, wherein the mapping processing module comprises:
a grid dividing module, adapted to dividing all the time-frequency grids in each time slot into multiple basic subsets which are not intersected with each other, wherein the number of sub-carriers contained in each basic subset is the same, and the number of time-frequency grids contained in each sub-carrier is the same, and the time-frequency grids contained in each sub-carrier are time-continuous in the time slot; and
a signal mapping module, adapted to map the one or more modulating signal vectors to the time-frequency grids of an allocated basic subset, if the time-frequency grids of one basic subset are used up, the rest modulating signal vectors are mapped to a next allocated basic subset.

12. The apparatus of claim 9, wherein the signal mapping module is further adapted to insert one or more null symbols in the modulating signal vector.

13. The apparatus of claim 8, further comprising:
a receiving processing module, adapted to receive one or more modulating signal vectors, and check all bits contained in the one or more modulating signal vectors, to recover the transmission message.

14. The apparatus of claim 13, wherein the receiving processing module is adapted to extract one or more modulating signal vectors according to a mapping rule adopted by the mapping processing module, check the modulating signal vectors to obtain one or more symbol vectors, and demodulate and decode the one or more symbol vectors to recover the transmission message.

* * * * *